United States Patent [19]

Gindler

[11] 3,915,643

[45] Oct. 28, 1975

[54] DETERMINATION OF SALICYLATE

[75] Inventor: E. Melvin Gindler, Rockford, Ill.

[73] Assignee: Pierce Chemical Company, Rockford, Ill.

[22] Filed: Aug. 8, 1974

[21] Appl. No.: 495,800

Related U.S. Application Data

[63] Continuation-in-part of Ser. No. 378,577, July 12, 1973, abandoned.

[52] U.S. Cl. ............. 23/230 B; 23/230 R; 252/408
[51] Int. Cl.$^2$ ................. G01N 21/22; G01N 33/16
[58] Field of Search ........ 252/408; 23/230 B, 230 R

[56] References Cited

UNITED STATES PATENTS

| | | | |
|---|---|---|---|
| 3,511,611 | 5/1970 | Rush | 23/230 B |
| 3,528,777 | 9/1970 | Moran | 23/230 B |
| 3,536,448 | 10/1970 | Patel | 23/230 B |
| 3,816,262 | 6/1974 | Monte et al. | 23/230 B |

OTHER PUBLICATIONS

Non–Ionic Surfactants I. R. Schmolka 1967 pp. 353–355.
Standard Methods of Clinical Chemistry—MacDonald et al.; Vol. 5, 1965 pp. 237–245.
Clinical Diagnosis By Laboratory Methods—Davidson & Henry, 14th ed. pp. 586–588–Salicylates.
Chem. Abstracts 7261$^8$—Simplified Methods For The Quantitative Deter. of Salicylates in Blood Serum—Vol. 40.

*Primary Examiner*—Morris O. Wolk
*Assistant Examiner*—Michael S. Marcus
*Attorney, Agent, or Firm*—Wolfe, Hubbard, Leydig, Voit & Osann, Ltd.

[57] ABSTRACT

Salicylate content in blood serum or the like can be spectrophotometrically determined using a new reagent solution. The reagent solution contains ferric ions, tungstic acid, phosphoric acid and a polyoxyethylene/polyoxypropylene block copolymer which is an effectively non-ionic surfactant. Preferably, when human blood sera is used, the standard employed for calibration contains a base so that both the standard and the reagent solution containing unknown are at the same pH. The described technique has the advantages of the Trinder method but does not contain mercuric chloride.

6 Claims, No Drawings

DETERMINATION OF SALICYLATE

This application is a continuation-in-part of my application, Ser. No. 378,577, filed July 12, 1973, now abandoned.

The present invention relates to the determination of salicylate in biologic fluid such as blood serum and the like. More particularly, the present invention relates to an improved reagent solution for a spectrophotometric determination of salicylate.

A rapid quantitative method for determining salicylate content in biologic fluids is of importance in diagnosing salicylism which is commonly known as aspirin poisoning. For some time the Trinder photometric method has been used. By this technique, a single reagent solution is added to the sample to be analyzed. The reagent solution contains ferric chloride, the ferric ion of which combines with salicylate in the sample to give a stable violet colored complex, and also contains mercuric chloride which serves to precipitate interfering proteins, lipids, hemoglobins, bilirubin, carotene and the like (hereinafter collectively referred to as interfering proteins). After centrifuging and removal of the precipitated interfering proteins, customary colorimetric analysis at about 540 nm is used to quantitatively indicate the level of salicylate.

While the Trinder technique is recognized as being sufficiently accurate for clinical purposes and convenient because only a single reagent solution is employed, the problem resides in the fact that mercuric chloride is employed. As is recognized, this compound is extremely poisonous, volatile, and creates pollution problems.

A principal object of the present invention resides in providing a method for the determination of salicylate which has the advantages associated with the Trinder technique but which does not utilize mercuric chloride or other noxious or dangerous ingredients.

A further object is to provide a mercury free, single reagent solution for the quantitative determination of salicylate by spectrophotometric analysis of the salicylate - ferric ion complex which is stable over a wide temperature range, effectively precipitates interfering proteins, and which gives a clear liquid after removal of precipitated material. Related to the foregoing object is the additional object of providing a reagent solution which contains a distinctive combination of protein precipitants and stabilizers such that the solution is stable as prepared and yet selectively precipitates protein when combined with the sample to be analyzed without adversely detracting from the accuracy of the analysis for salicylate content.

Other objects and advantages of the present invention will become apparent in view of the following description.

While the invention will be described in connection with certain preferred embodiments, it is to be understood that the invention is not to be limited to only those embodiments. On the contrary, it is intended to cover all modifications thereof falling within the spirit and scope of the invention as expressed in the appended claims.

Briefly stated, it has been discovered that a reagent solution containing, in addition to ferric ions, also tungstic acid, phosphoric acid and an effectively non-ionic surfactant has the advantages associated with the Trinder reagent without the attendant hazardous disadvantage of having mercuric chloride present. A particularly surprising aspect of the present invention is that the reagent solution is stable for extended periods of time in spite of the fact that it contains significant quantities of multivalent and oppositely charged ingredients. Furthermore, on precipitation, significant quantities of salicylate are not coprecipitated with the protein and sufficient accuracy is achieved.

The following example illustrates the present invention.

Two liters of working solution are prepared by mixing together the following two solutions (A and B). Solution A is 12.0 grams $Na_2WO_4 \cdot 2H_2O$ dissolved in deionized water to form one liter. Solution B contains the following ingredients dissolved in deionized water to also yield 1 liter of solution: 5 ml.conc. $H_2SO_4$; 0.50 ml. 85% $H_3PO_4$; 5 ml. essentially ion free "Tetronic" 707 non-ionic surfactant (16 gm./100 ml. aqueous solution) and 10 grams $FeCl_3 \cdot 6 H_2O$. The reagent solution so formed, while at times turbid shortly after preparation, becomes a clear acidic liquid (pH 1.2–1.7) after standing for several hours and is thereafter stable for an extended period of time.

Two ml. of clear reagent solution formed as above described is added to a solution of 200 micro liters of human serum in 2.0 ml. of water. On addition of the reagent solution, a finely divided precipitate is formed which is then removed by centrifuging or filtering to leave a clear liquid. If salicylate is present then this liquid is violet. The liquid can then be analyzed by customary spectrophotometric techniques at 540 nm., and salicylate concentration determined with the use of a suitably constructed calibration graph in accordance with customary techniques.

While the calibration procedure is generally conventional, it has been found that exceptional accuracy can be obtained when the standard used for calibration containing known salicylate concentration and reagent is at about the same pH as is the sample reagent mixture being analyzed for salicylate. And, since human sera is more basic than the reagent, such enhanced accuracy can be achieved by adding a small amount of a weak base to the sample used as the standard. For example, the solution described above containing human serum has a pH of about 1.73–1.76. When the standard is prepared with simply the working solution and added salicylate, it has a slightly lower pH which can, to a small degree, result in an inaccurate measurement. By, however, adding the weak base, tris (hydroxymethyl) aminomethane to the standard solution to give a 0.113 molar solution of the base, the inaccuracy can be eliminated.

Referring to the working solution illustrated above, it will be appreciated that it is simple to prepare. The essential ingredients present are tungstic acid, phosphoric acid, an effectively non-ionic surfactant, and ferric ion.

As illustrated, the ferric ion is present in a concentration of about 18.5 millimole per liter of reagent solution which is substantially in excess of the maximum salicylic acid concentration which could be expected in human serum, the latter being about $5.8 \times 10^{-3}$ millimole per 200 micro liter of sample.

Also, as illustrated, sulphuric acid is included in order to convert the tungstate, which is added as sodium tungstate, into tungstic acid which is best considered as a hydrated polymerized $WO_3$ sol, see, e.g., Emelius and Sharpe, Modern Aspects of Inorganic Chemistry, pp. 280–289, 4th Ed. Wiley, 1973. And in the presence of phosphoric acid, the hydrated $WO_3$ sol probably forms a phosphotungstate complex of variable composition. In preparing a useful solution, other sources of tungstic acid, phosphoric acid and ferric ion can, of course, be employed so long as their residues do not adversely interfere with the advantages of the illustrated working solution. For stability the solution should have a pH of less than about 2 and above about 1 in order to permit formation of the ferric ion-salicylate complex.

Regarding the surfactant, it desirably is effectively non-ionic, i.e., has no ionic groups or if such ionic groups are present, they are effectively buried and/or screened by very large non-ionic groups. The presence of the surfactant aids in rapid stabilization or clarification of the reagent solution. It also may aid in a clean precipitation so that on centrifuging the supernatant liquid is not turbid. However, if excess quantities of surfactant are employed, it is difficult to achieve adequate interfering protein precipitation. Regarding the type of effectively non-ionic surfactant, water soluble polyoxyethylene/polyoxypropylene block copolymers are considered most useful. The specifically illustrated TETRONIC 707 is a water soluble effectively non-ionic block copolymer (having hidden and essentially unavailable amino nitrogen atoms) prepared by the addition of propylene oxide to ethylenediamine followed by the addition of ethylene oxide. This surfactant, as well as other useful water soluble TETRONIC essentially non-ionic surfactants are described in detail on pages 353–355 of "Non-ionic Surfactants" (By I.R. Schmolka, Ed. Martin J. Schick, Marcel Decker Inc., 1967). As set forth therein, the TETRONIC surfactants are supplied by Wyandotte Chemicals Corp. (now BASF-WYANDOTTE) and have the structure

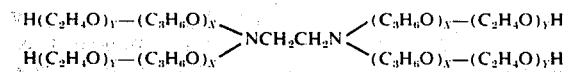

where the molecular weight of each polyoxypropylene group ranges from at least 225 to about 6250 and $y$ is 20 to 90 percent of the total weight of the product. TETRONIC 707 is identified as having a base molecular weight (polyoxypropylene groups) of 2501–3000 a hydrophillic polyoxyethylene content, by weight, of approximately 70%, a cloud point (10% aqueous solution) of greater than 100°C., and a melting point of 49°C.

Also, non-nitrogen containing block copolymers of this type such as the water soluble "Pluronics," e.g., "PLURONIC F-68," are also useful. As identified in the above reference, the "Pluronics" have the structure $$HO(C_2H_4O)_a (C_3H_6O)_b (C_2H_4O)_cH$$

where $b$ is at least 15, and $(C_2H_4O)_{a+c}$ is 20 to 90 percent of the total weight of the compound. "PLURONIC F-68" is identified as having a polyoxypropylene base molecular weight of 1750 and a polyoxyethylene content by weight of 80%.

Keeping in mind the above described function of the non-ionic surfactant, the particular type of surfactant as well as its useful amount can be determined by simple experimentation.

Regarding the presence of tungstic acid and phosphoric acid in the working solution, it is believed that both of these reagents are necessary to achieve a stable solution in the presence of ferric ion which is capable of precipitating interfering proteins. The fact that tungstic acid can be used to precipitate protein has been recognized and it should be present in a sufficient amount to effectively precipitate the proteins. Regarding the amount of phosphoric acid, it has been found that if excessive quantities are used, the acid will combine with the ferric ion present thus potentially detracting from the sensitivity of the measurement. Addition of phosphoric acid in the minimum amount necessary to achieve reagent solution stability is preferred.

Thus, as is apparent, there has been described herein a reagent solution and method for the determination of salicylate which fully satisfies the aims and objectives of the present invention. The reagent solution is easy to prepare, is stable, and the ferric ions therein can react with salicylate to give an identifiable color. While having the advantages associated with the customary Trinder procedure, the present working solution does not contain or require undesirably hazardous mercuric chloride.

I claim as my invention:

1. An aqueous reagent solution useful for the spectrophotometric determination of salicylate consisting essentially of ferric ions in excess of the amount necessary to combine with salicylate in the sample being analyzed, tungstic acid, phosphoric acid, and a water soluble polyoxyethylene/polyoxypropylene block copolymer as an effectively non-ionic surfactant, the tungstic acid being present in an amount sufficient to precipitate protein in the sample being analyzed with the phosphoric acid and non-ionic surfactant being present so as to provide a stable solution which, after removal of precipitated interfering proteins, is a clear, non-turbid liquid.

2. In a spectrophotometric method for the determination of salicylate comprising adding a ferric containing reagent solution to a sample to be analyzed, precipitating interfering proteins, and thereafter measuring the intensity of the ferric-salicylate complex, the improvement wherein the reagent solution consists essentially of ferric ions in excess of the amount necessary to combine with salicylate in the sample being analyzed, tungstic acid, phosphoric acid, and a water soluble polyoxyethylene/polyoxypropylene block copolymer effectively non-ionic surfactant, the tungstic acid being present in an amount sufficient to precipitate protein in the sample being analyzed with the phosphoric acid and non-ionic surfactant being present so as to provide a stable solution which, after removal of precipitated interfering proteins, is a clear, non-turbid liquid.

3. The solution of claim 1 wherein the surfactant has the structure

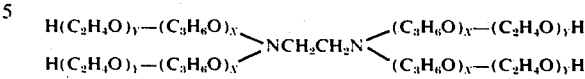

where the molecular weight of each polyoxypropylene group ranges from at least 225 to about 6,250 and $y$ is 20 to 90 percent of the total weight of the product.

4. The method of claim 2 wherein the surfactant has the structure

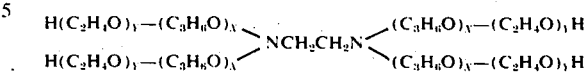

where the molecular weight of each polyoxypropylene group ranges from at least 225 to about 6,250 and y is 20 to 90 percent of the total weight of the product.

5. The solution of claim 3 wherein the surfactant has a base molecular weight of 2501–3000 and a hydrophilic polyoxyethylene content, by weight of approximately 70%.

6. The method of claim 4 wherein the surfactant has a base molecular weight of 2501–3000 and a hydrophilic polyoxyethylene content, by weight of approximately 70%.

* * * * *